United States Patent [19]

Schaefer

[11] 4,205,338

[45] May 27, 1980

[54] DISC RECORDING TRACKING SYSTEM

[75] Inventor: Louis F. Schaefer, Palo Alto, Calif.

[73] Assignee: Laser File Inc., Los Angeles, Calif.

[21] Appl. No.: 848,125

[22] Filed: Nov. 3, 1977

[51] Int. Cl.² ............................................. H04N 5/76
[52] U.S. Cl. .......................... 358/28.5; 179/100.3 V;
346/76 L
[58] Field of Search ............................ 358/128, 297;
179/100.3 V; 346/76 L; 250/570

[56] References Cited

U.S. PATENT DOCUMENTS

| | | | |
|---|---|---|---|
| 3,654,624 | 4/1972 | Becker et al. | 365/127 |
| 3,657,707 | 4/1972 | McFarland et al. | 346/76 L X |
| 3,962,688 | 6/1976 | Westerberg | 358/128 |
| 4,065,786 | 12/1977 | Stewart | 358/128 |
| 4,094,010 | 6/1978 | Pepperl et al. | 365/324 X |
| 4,094,013 | 6/1978 | Hill et al. | 365/234 |
| 4,138,741 | 2/1979 | Hedlund et al. | 365/324 X |

*Primary Examiner*—Theodore M. Blum
*Attorney, Agent, or Firm*—Albert Macovski

[57] ABSTRACT

A prerecorded track on a disc is automatically tracked resulting in a radial tracking signal. Components of this signal are stored during a prerecording interval. During recording these stored components are used to produce a restored radial tracking signal which is used to radially position the recording energy source and keep the newly recorded tracks at a fixed distance from the previously recorded tracks.

14 Claims, 3 Drawing Figures

DISC RECORDING TRACKING SYSTEM

CROSS REFERENCES TO RELATED APPLICATIONS

This application is closely related to U.S. patent application Ser. No. 781,056, "Information Storage and Retrieval System," filed Mar. 24, 1977. The inventor in this application, Louis F. Schaefer, is one of the co-inventors of the previous application.

BACKGROUND OF THE INVENTION

1. Field of the Invention

This invention relates to information storage systems using a disc format. In a primary application this invention relates to storing information on a disc which can be removed and then replaced for further information storage. Another application of this invention is the recording of new tracks on a previously recorded disc with the new tracks being uniformly spaced from the previously recorded tracks.

2. Description of Prior Art

Many commercially available disc recording systems are presently in use which utilize either optical, magnetic or mechanical techniques. In these systems there is usually some problem in achieving uniformly spaced tracks. This is particularly difficult if the information capacity on the disc is efficiently used and the tracks are closely packed. There is the danger of newly written tracks obliterating the previous tracks by crossing them.

In some applications, the entire disc is recorded during a single sequence without removing it and replacing it for further recorded information. This is the case, for example, in the MCA Disco-Vision System where the entire disc is recorded at one time and copies are made from it. In document storage systems, however, where individual documents are added at different times, the disc presents serious tracking problems. If the disc is removed and then remounted, the resultant eccentricities of the tracks from a slightly off-center mounting can cause the tracks to cross and thus be destroyed. If large guard spaces are used to avoid track crossing, the storage area is used inefficiently and a limited number of documents can be stored.

One solution to this problem is described in the previously referenced U.S. patent application Ser. No. 781,056. Here an optical tracking system is used to follow a previously recorded track and control the radial position of the newly recorded tracks so that they will be uniformly spaced from the previous tracks. This system, however, is relatively expensive to implement in that it requires an additional laser light source for the tracking operations while recording is taking place. In addition, it is limited to those systems where the newly written tracks are immediately available to be read for tracking purposes. Thus, for example, recording on photographic materials, which requires subsequent development, could not be used with this tracking system.

SUMMARY OF THE INVENTION

An object of this invention is to provide a system for recording information on a disc with the tracks being uniformly spaced with respect to previously recorded tracks.

It is also an object of this invention to provide an optical disc tracking system which does not require an additional laser light source.

It is a further object of this invention to provide a method of highdensity recording on a disc without the recorded tracks overlapping.

It is a further object of this invention to provide a disc recording system which corrects for the eccentricity which is often introduced when the disc is removed and returned to the original recorder or to a different recorder.

Briefly, in accordance with the invention, a closed loop tracking system is used to follow a previously recorded track on a disc. Components of the resultant radial tracking signal, which corrects primarily for the eccentricity of the track, are stored. Following this prerecording interval, new information tracks are recorded on the disc. A restored radial tracking signal is reconstructed from the stored components of the radial tracking signal. This restored radial tracking signal is used to radially translate the recording energy source so as to keep the newly recorded tracks uniformly spaced from the previously recorded tracks. The stored components of the radial tracking signal can be in the form of samples, or the amplitude and phase of the fundamental component.

BRIEF DESCRIPTION OF THE DRAWINGS

For a more complete disclosure of the invention, reference can be made to the following detailed description of several illustrative embodiments thereof which is given in conjunction with the accompanying drawings, of which:

The present invention can be used with disc recording systems where the recording energy is light, magnetic, mechanical, etc. In FIG. 1 an optical system is shown. An intense light source such as laser 12 is modulated by light modulater 13. The modulator is controlled by information signal 14 which can be a variety of sources such as a digital signal or the output of a facsimile scanner. This modulated light is passed through partially reflecting mirror 15 through linear actuator 34. This linear actuator 34 is used to radially drive the recording energy source as disc 10 rotates so as to produce a spiral track. After passing through linear actuator 34 the modulated light is reflected off controlled mirror 16, and is focused by lens 18 with focused spot 38 on a photosensitive coating on disc 10. Disc 10 is rotated by motor 11.

The problem in systems of this type is that of accurate tracking of newly recorder information with respect to previously recorded tracks. If the disc is removed and replaced on the original recording machine, or a different machine, it is likely to be somewhat off center causing eccentricity of the new tracks. These tracks can cross and destroy the previously recorded tracks. This problem is solved in U.S. Patent Application 781,056 using a tracking system which continuously tracks the previously recorder tracks. This system, however, requires an additional laser light source for the tracking operation. In addition, it requires that the newly recorded information be immediately available for tracking.

Figure 1:
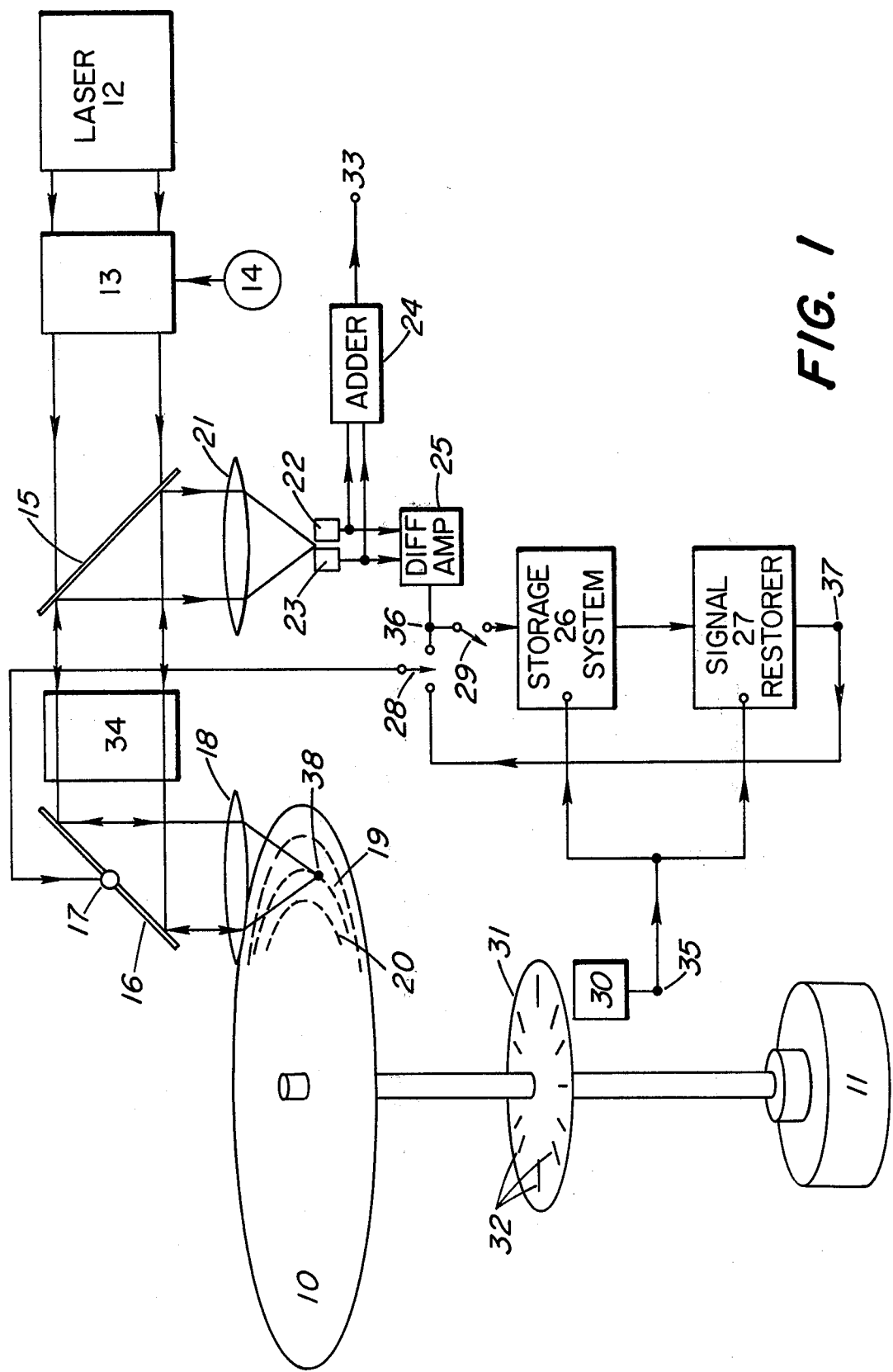
FIG. 1 is a schematic representation of an embodiment of the invention using optical recording.

In FIG. 1 a prerecording interval is used to develop a tracking signal so that no additional laser light source is required and the newly recorded information need not be immediately available. For example, track 19 is a previously recorded track on disc 10. During this prerecording interval no information signal 14 has to be applied to modulator 13 so that an unmodulated light source can be used. Light reflected from track 19 is collimated by lens 18, reflected from controlled mirror 16 through linear actuator 34. It is then reflected off partially reflecting mirror 15 and is focused by lens 21 onto a pair of adjacent photosensors 22 and 23. These photosensors receive reflections from radially adjacent portions of track 19 on disc 10. When the focused spot 38 is at the center of track 19, photosensors 22 and 23 receive identical data. When focused spot 38 is off center one of these photosensors will receive increasing intensity and the other decreasing intensity. The outputs of these photosensors are applied to difference amplifier 25 which takes the difference of the outputs and produces radial tracking signal 36.

During this prerecording interval switch 28 is on the right to complete the control loop and switch 29 is closed to store the resultant radial tracking signal 36. The control signal 36 is then applied to rotator 17 which rotates controlled mirror 16 and thus radially translates focused spot 38. Rotator 17 can be a servomotor driven by an appropriate servoamplifier. This completed control loop causes focused spot 38 to follow track 19 using radial tracking signal 36.

The radial tracking signal 36 is correcting for eccentricities of track 19 and any other sources of tracking error such as warping of the disc or vibration. With switch 29 closed components of radial tracking signal 36 are stored in storage system 26. This storage system stores components from a single rotation of the disc. The storage system is controlled by disc signal 35 which is derived from the reference disc 31 and pickup 30 which can be optical or magnetic. Disc 31 rotates synchronously with the information disc 10. Disc signal 35 defines the specific portion of the rotation cycle. The specific makeup of reference disc 31 and disc signal 35 depends on which components of the radial tracking signal 36 are stored.

After radial tracking signal 36 is stored during the prerecording interval switch 28 is turned to the left and switch 29 is opened to begin the recording of information signal 14 on new tracks such as track 20. Signal restorer 27 takes the stored components of the radial tracking signal from storage system 26 and uses them to produce a restored radial tracking signal 37. This operation also requires disc signal 35 to use the stored components in 26 to create a repetitive restored radial tracking signal 37 which repeats at the rotational rate. This restored signal 37 is then used to control rotator 17 to radially position spot 38. In this way newly recorder track 20 will be uniformly spaced from the previously recorder track 19 since it will be experiencing substantially the same radial correction signal. The radial corrections due to controlled mirror 16 are thus superimposed on the uniform motion of linear actuator 34. Controlled mirror 16 can supply both the uniform motion and the tracking so that linear actuator 34 would not be required.

In the interest of economy, some of the structures used for tracking can also be used in the playback mode. Light source 12 can be used on playback with modulator 13 and information signal 14 not required. The same tracking system, using photosensors 22 and 23 can be used to keep spot 38 following the track. The output signal can be derived from a separate photosensor or from photosensor 22 or 23. Alternatively, as shown in FIG. 1, the photosensor outputs can be added in adder 24 to form readout signal 33.

Figure 2:
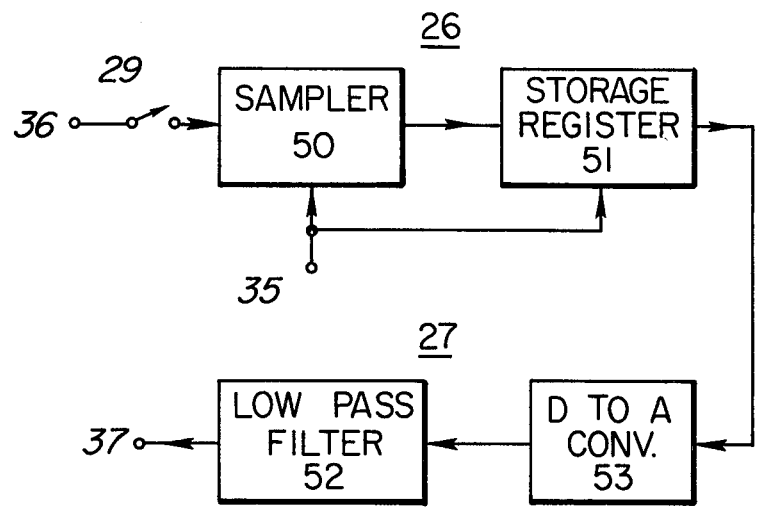
FIG. 2 is a schematic representation of an embodiment for storing and retrieving the radial tracking signal.

FIG. 2 shows an embodiment for storing and reconstructing the radial tracking signal. In this embodiment disc signal 35 is a series of pulses representing different circumferential positions around disc 31 shown in FIG. 1. This signal is derived from a series of marks 32 on disc 31 which are detected by pickup 30. The radial tracking signal 36 is applied, through closed switch 29. Sampler 50 samples the radial tracking signal 36 using the pulses of disc signal 35. The resultant samples are stored in storage register 51. This storage register is preferably a digital storage structure to facilitate long-term storage. The storage register 51 can have the form of a digital shift register. After a prerecorder track 19 is scanned, and radial tracking signal 36 is stored, switch 29 is opened. Signal restorer 27 is used to reconstruct the radial tracking signal from the stored components to produce the restored radial tracking signal 37. Here the pulses from disc signal 35 are used to sequence through the stored samples of storage register 51. These are applied to digital-to-analog converter 53 and then to low pass filter 52 which provides a smooth output by filtering out the abrupt changes. The filtered output 37 is the restored radial tracking signal which is used to radially position the focused spot of the newly recorded tracks. A variety of other analog and digital systems can be used to store the samples of signal 36 and sequence through them to produce signal 37.

Figure 3:
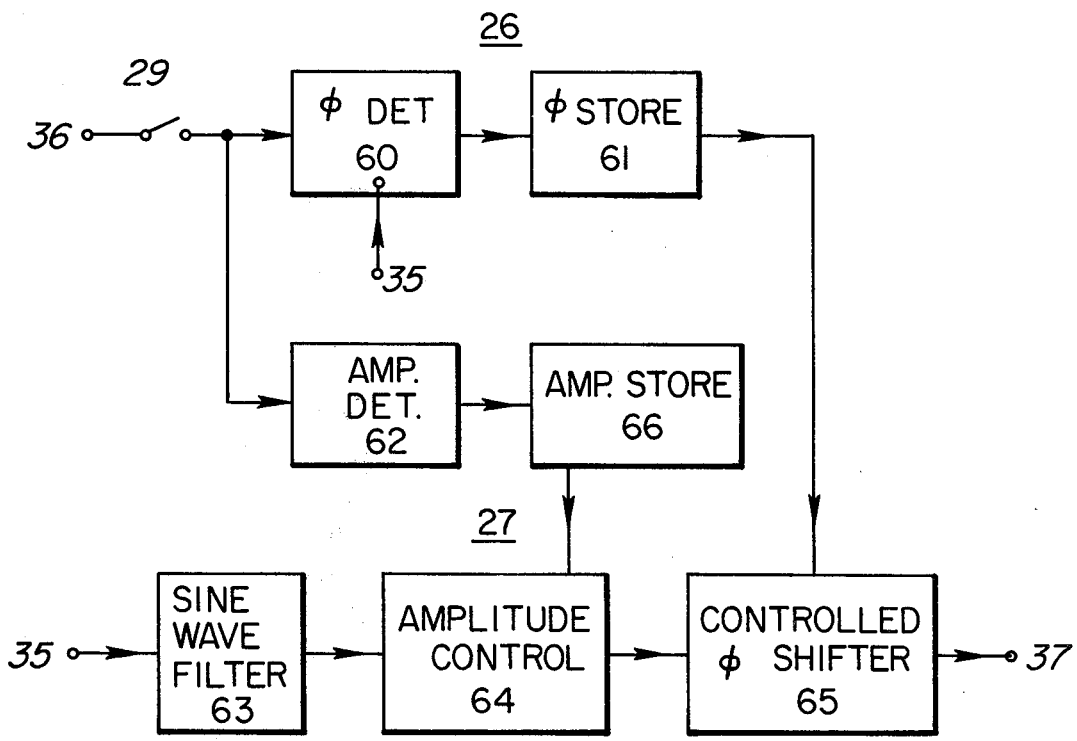
FIG. 3 is a schematic representation of another embodiment for storing and retrieving the radial tracking signal using the fundamental component.

FIG. 3 shows an alternate embodiment of the storage and reconstruction system. In this embodiment the assumption is made that the sole important radial correction signal is a sinusoidal signal to correct for eccentricity. Only the fundamental component of radial tracking signal 36 is measured and reconstructed. Disc signal 35 can consist of a single pulse from a portion of the disc. This signal 35 is then compared with the radial tracking signal 36 in phase detector 60 to develop an output signal which represents the relative phase of the fundamental component of signal 36. This output signal is stored in phase store 61 which can be a digital storage register. The amplitude of radial tracking signal 36 is measured by amplitude detector 62, which can be an envelope detector. The detected output is stored in amplitude store 66 which can be another digital register. Thus the storage system 26 includes structures which measure and store the phase and amplitude of signal 36.

The signal restoring system 27 reconstructs a sine wave having the appropriate phase and amplitude. Disc signal 35 is applied to a sinusoidal filter, such as a tuned circuit, which extracts the fundamental commponent and produces a reference sine wave signal. This sine wave is applied to amplitude control 64 which varies the amplitude of the reference sine wave signal in accordance with the stored value in amplitude store 66. Amplitude control 64 can be a variable gain amplifier. The output of amplitude control 64 is a sine wave of the correct amplitude. This amplitude corrected sine wave is applied to controlled phase shifter 65 where its phase is shifted in accordance with the value stored in phase store 61. Controlled phase shifter 65 can be a circuit with electrically variable reactances such as active circuits with feedback or saturable reactors. Alternatively it can be a variable delay line such as a charged coupled device with a variable clock frequency. When appropriately phase-shifted the restored radial tracking signal 37 is an adequate representation of the tracking errors and can be used to position the newly written tracks with respect to the existing tracks.

Although an optical system was used in the illustrative examples it is clear that a variety of other disc recording techniques can also use this tracking system including magnetic, thermal, and mechanical systems. For example, using a magnetic disc, a pair of adjacent magnetic heads can be used for tracking a previously recorded magnetic track and producing a radial tracking signal which is stored. The restored radial tracking signal, reconstructed from the stored components, is then used to control the radial position of newly written tracks by positioning the recording head.

Although the description was limited to a disc format, the system can be used with other rotating formats. For example the system can be applied to a rotating drum system where it is desired to have newly written tracks equally spaced axially from the previously written tracks. Here the axial variations in the previous tracks are monitored using a closed loop tracking system with components of the resultant axial control signal stored. A restored axial tracking signal, derived from the stored components, is then used to control the axial position of the newly recorded tracks.

In the systems described, a single track was used to develop the tracking signal. A more accurate stored tracking signal will obviously result if two or more track positions are averaged.

In the systems described the previously recorded track contained information. Alternatively this track can be an unmodulated reference track at a fixed radius on the disc which is used to develop the tracking signal.

What is claimed is:

1. In a method for recording on a disc the steps of:
    tracking a previously recorded track on the disc using two adjacent photosensors positioned to read radially adjacent portions of the track and producing a radial tracking signal from the difference of the output of the two photosensors;
    measuring the fundamental frequency components of the radial tracking signal using an amplitude detector and a phase detector;
    storing the fundamental components of the radial tracking signal using an amplitude store and a phase store; and
    controlling the radial position of the newly recorded tracks using the stored components of the radial tracking signal.

2. The method as recited in claim 1 wherein the step of controlling the position of the newly recorded tracks includes the steps of generating a restored tracking signal from the stored components of the radial tracking signal and radially positioning a source of modulated energy using the restored tracking signal.

3. Apparatus for recording information on a photosensitive disc comprising:
    a modulated light source for recording the information on the disc;
    means for measuring the radial components of a previously recorded track on the disc using two adjacent photosensors positioned to read radially adjacent portions of the track to produce a radial tracking signal from the difference of the output of the two photosensors;
    an amplitude detector for measuring the amplitude of the fundamental component of the radial tracking signal;
    a phase detector for measuring the phase of the fundamental component of the radial tracking signal;
    means for storing the amplitude and phase of the fundamental component of the radial tracking in storage structures;
    means for producing a restored radial tracking signal from the stored components of the radial tracking signal; and
    means for radially positioning the modulated light source using the restored radial tracking signal whereby newly recorded tracks will be substantially uniformly spaced from the previously recorded tracks.

4. Apparatus as recited in claim 3 wherein the means for producing a restored radial tracking signal includes means for generating a sinusoidal signal whose frequency is equal to the disc rotation rate and whose amplitude and phase are determined by the measurements stored in the storage structures.

5. Apparatus as recited in claim 3 wherein the means for measuring the radial components of a previously recorded track on the disc to produce a radial tracking signal are also used to read out the information on the disc.

6. Apparatus as recited in claim 5 where the sum of the output signals from the pair of photosensors form the readout signal for the information on the disc.

7. In a method for recording information on a disc the steps of:
    tracking a previously recorded track on the disc and producing a radial tracking signal;
    measuring two components of the radial tracking signal representing the amplitude and the phase of the fundamental component of the radial tracking signal;
    storing the two components representing the amplitude and phase of the fundamental component of the radial tracking signal; and
    controlling the radial position of the newly recorded tracks using the two stored components representing the amplitude and phase of the fundamental component of the radial tracking signal.

8. The method as recited in claim 7 wherein the step of tracking a previously recorded track on the disc and producing a radial tracking signal includes the steps of comparing the radial position of an energy source to that of the previously recorded track to produce the radial tracking signal and radially positioning the energy source in response to the radial tracking signal in a closed loop system.

9. The method as recited in claim 7 wherein the step of controlling the radial position of the newly recorded tracks includes the step of generating a restored sinusoidal tracking signal from the two stored components representing the amplitude and phase of the fundamental component of the radial tracking signal and radially positioning a source of modulated energy using the restored tracking signal.

10. Apparatus for recording information on a disc comprising:
    a source of modulated energy for recording the information on the disc;
    means for measuring the radial components of a previously recorded track on the disc to produce a radial tracking signal;

an amplitude detector for determining the amplitude of the fundamental component of the radial tracking signal;

a phase detector for determining the phase of the fundamental component of the radial tracking signal;

an amplitude store for storing the amplitude of the fundamental component of the radial tracking signal;

a phase store for storing the phase of the fundamental component of the radial tracking signal;

means for producing a restored radial tracking signal from the stored amplitude and phase values;

means for radially positioning the source of modulated energy using the restored radial tracking signal whereby newly recorded tracks will be substantially uniformly spaced from the previously recorded tracks.

11. Apparatus as recited in claim 10 wherein the modulated source of energy is a modulated light source and the disc is photosensitive.

12. Apparatus as recited in claim 11 wherein the means for measuring the radial components of a previously recorded track on the disc to produce a radial tracking signal include means for measuring the radial position of the modulated light source with respect to the previously recorded track and using the resultant radial tracking signal to radially translate the modulated light source.

13. Apparatus as recited in claim 12 wherein the means for measuring the radial position of the modulated light source with respect to a previously recorded track comprises:

two adjacent photosensors positioned to read radially adjacent portions of the rotating disc;

means for imaging the previously recorded track onto the photosensors; and means for deriving the radial tracking signal from the difference of the output of the two photosensors.

14. Apparatus as recited in claim 10 wherein the means for producing a restored radial tracking signal includes means for generating a sinusoidal signal whose frequency is equal to the disc rotation rate and whose amplitude and phase are determined by the stored amplitude and phase values.

* * * * *